(12) United States Patent
Hutchinson et al.

(10) Patent No.: US 9,054,931 B2
(45) Date of Patent: Jun. 9, 2015

(54) METHOD AND APPARATUS FOR DATA TRANSMISSION IN HOME NETWORKS

(75) Inventors: Darren Hutchinson, San Jose, CA (US); Sigurd Schelstraete, Menlo Park, CA (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 459 days.

(21) Appl. No.: 13/483,016

(22) Filed: May 29, 2012

(65) Prior Publication Data

US 2012/0236874 A1    Sep. 20, 2012

Related U.S. Application Data

(62) Division of application No. 12/583,538, filed on Aug. 21, 2009, now Pat. No. 8,189,457.

(60) Provisional application No. 61/090,881, filed on Aug. 21, 2008.

(51) Int. Cl.
| | |
|---|---|
| *H04L 12/413* | (2006.01) |
| *H04L 27/26* | (2006.01) |
| *H04L 1/18* | (2006.01) |
| *H04L 5/00* | (2006.01) |

(52) U.S. Cl.
CPC .......... *H04L 27/2626* (2013.01); *H04L 1/1854* (2013.01); *H04L 5/0005* (2013.01); *H04L 5/0037* (2013.01); *H04L 5/0091* (2013.01); *H04L 27/2647* (2013.01)

(58) Field of Classification Search
USPC ......... 370/349, 532, 535, 539, 541, 321, 329, 370/337, 347, 341, 348, 431, 442, 446
See application file for complete search history.

(56) References Cited

U.S. PATENT DOCUMENTS

| | | | | |
|---|---|---|---|---|
| 5,469,468 | A * | 11/1995 | Schilling | ................... 375/130 |
| 7,359,444 | B1 | 4/2008 | Toumani et al. | |
| 7,881,362 | B2 * | 2/2011 | Shridhar et al. | ............... 375/219 |
| 2002/0086707 | A1 | 7/2002 | Struhsaker et al. | |
| 2004/0047324 | A1 | 3/2004 | Diener | |
| 2007/0040704 | A1 | 2/2007 | Smee et al. | |
| 2007/0121676 | A1 | 5/2007 | Koga et al. | |
| 2008/0165893 | A1 | 7/2008 | Malladi et al. | |

\* cited by examiner

*Primary Examiner* — Brenda H Pham

(74) *Attorney, Agent, or Firm* — Pillsbury Winthrop Shaw Pittman LLP

(57) ABSTRACT

A multi-tone modem with components forming a transmit path and a receive path configured to couple to a wired communication medium for at least intermittent communication of frequency division multiplexed multi-tone modulated communication channels thereon. A Fourier transform component transforms received communication channels between a time domain and a frequency domain and vice-versa. Selected components on the receive path determine alignments between the received multiplexed communication channels in the time domain using alignment determinations made in both a time domain and frequency domain portions of the receive path. The Fourier transform component transforms a stream of digitized samples of the received multiplexed communication channels from the time to the frequency domain using the alignment determinations made by the selected components on the receive path.

10 Claims, 7 Drawing Sheets

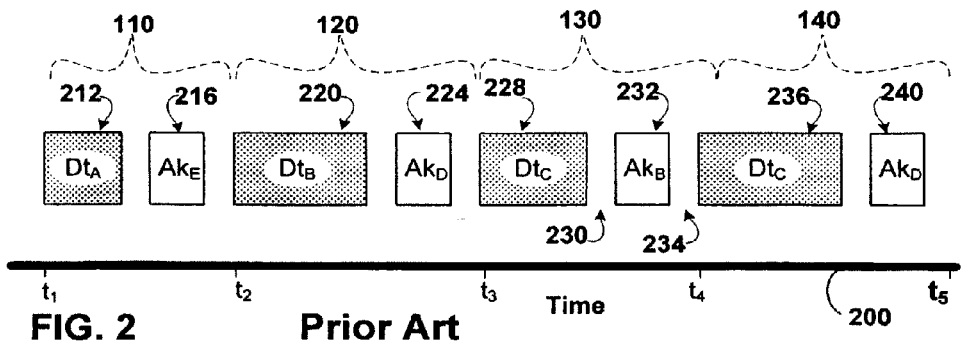
FIG. 2  Prior Art
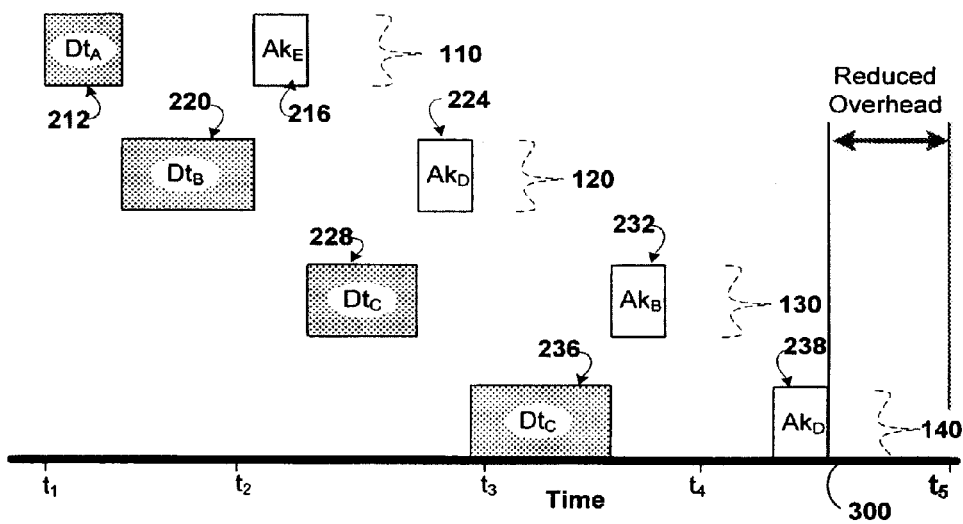
FIG. 3A  Overlap Scheduling for TDMA / CSMA
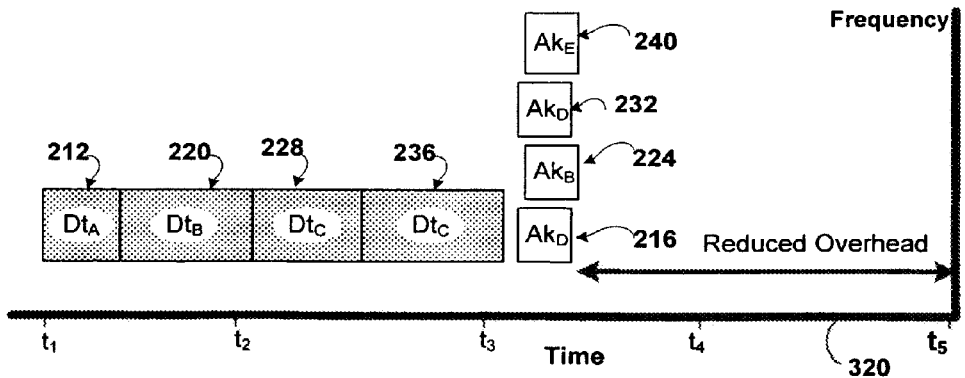
FIG. 3B  Overlap Scheduling for TDMA / CSMA

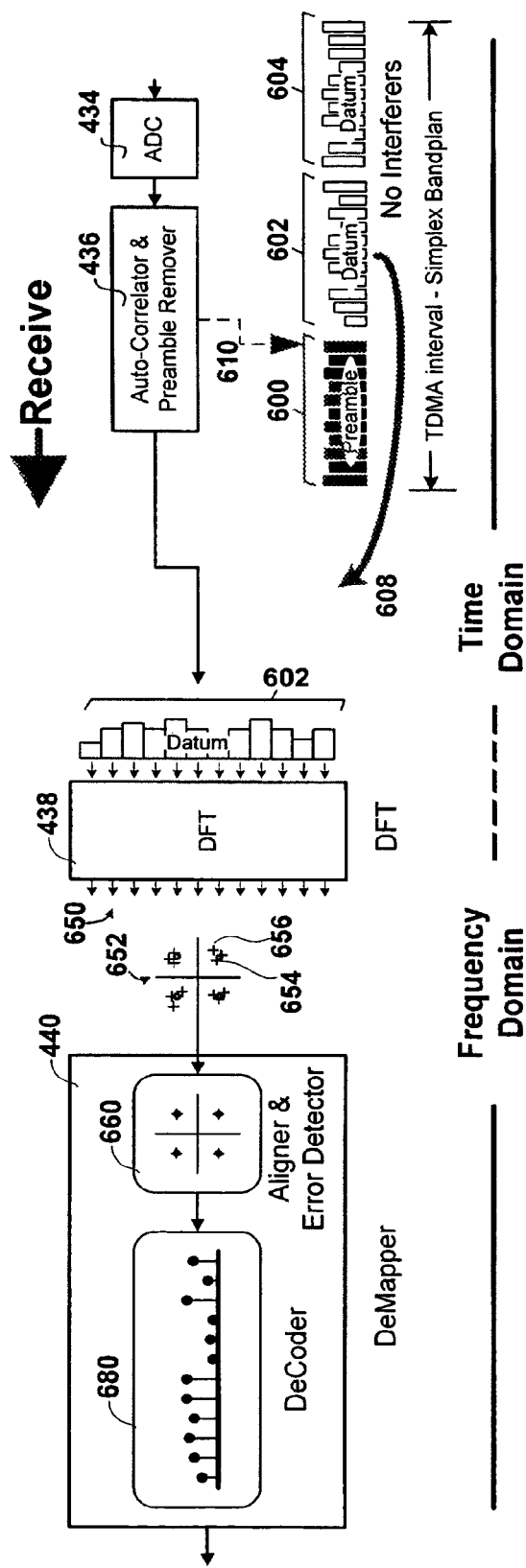
FIG. 6A　　SIMPLEX MODE

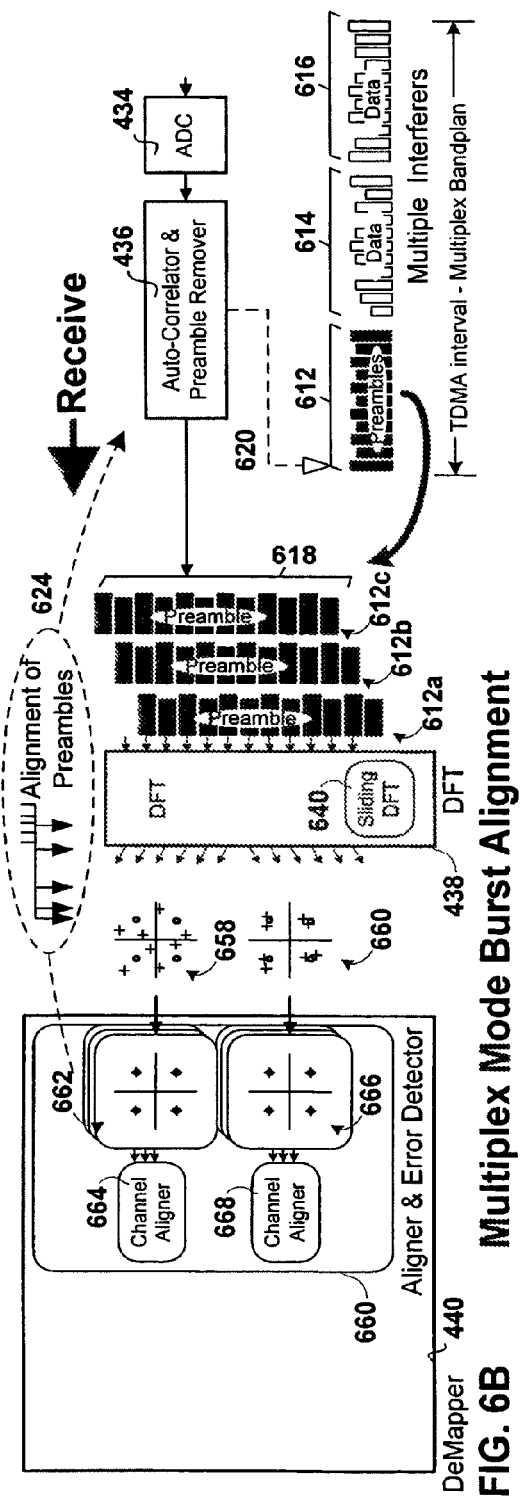
FIG. 6B  Multiplex Mode Burst Alignment
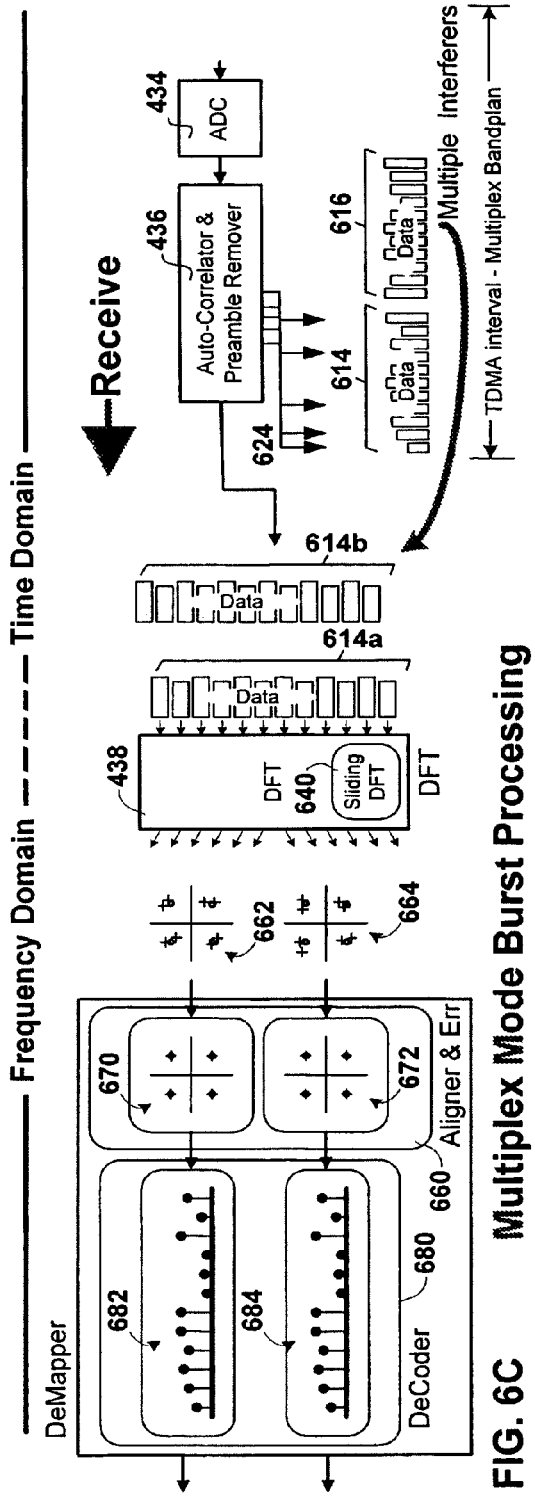
FIG. 6C  Multiplex Mode Burst Processing

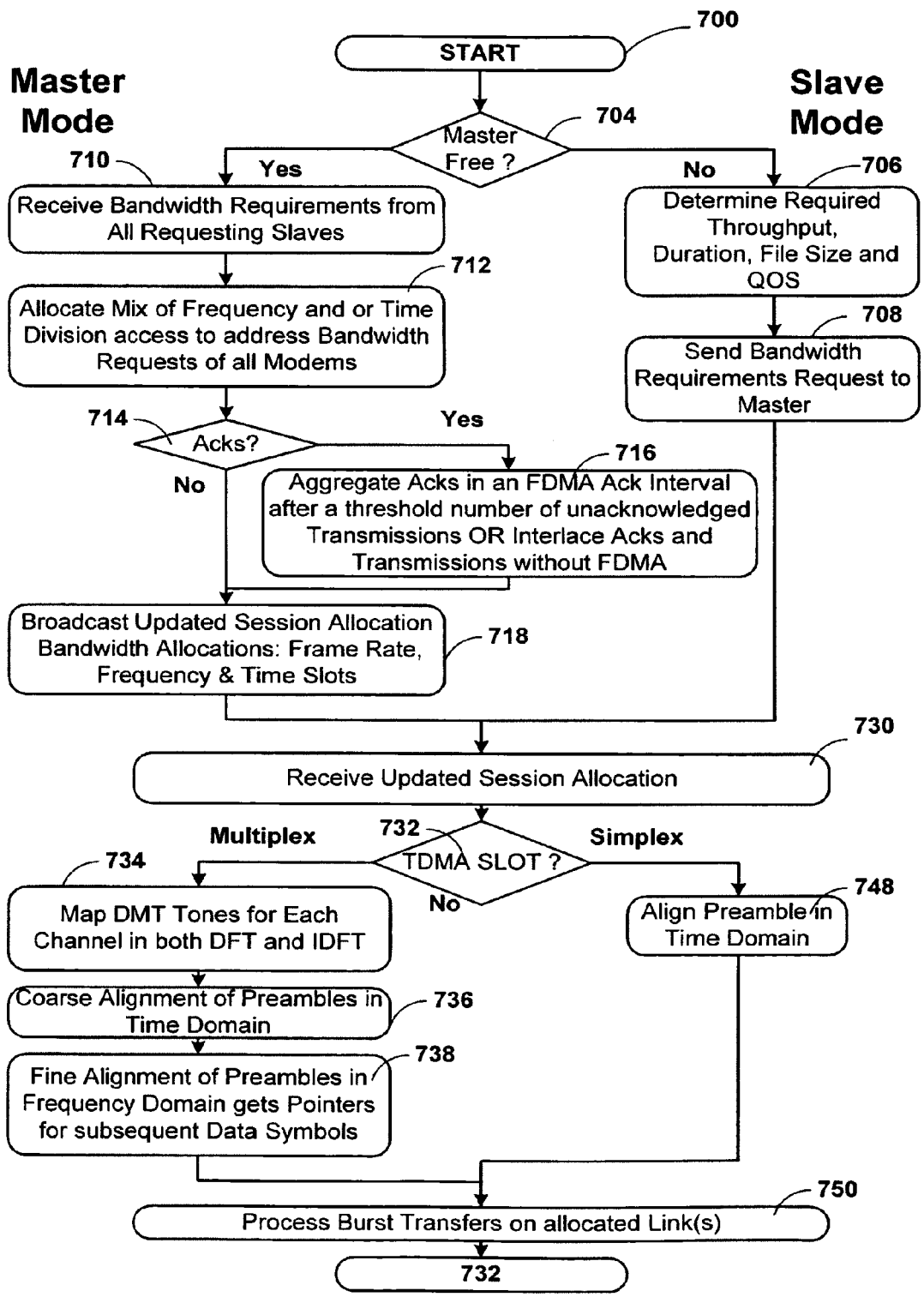
FIG. 7    Network Modem Burst Mode Processing

METHOD AND APPARATUS FOR DATA TRANSMISSION IN HOME NETWORKS

CROSS-REFERENCE TO RELATED APPLICATIONS

The present application is a divisional of U.S. application Ser. No. 12/583,538 filed Aug. 21, 2009, now U.S. Pat. No. 8,189,457, which claims the benefit of U.S. Provisional Application No. 61/090,881 filed on Aug. 21, 2008 entitled "Optimizing Link Efficiency in G.hn-type Networks", the contents of all such applications are incorporated herein by reference in their entirety as if fully set forth herein.

FIELD OF THE INVENTION

The field of the present invention relates to multi-tone transceivers.

BACKGROUND OF THE INVENTION

A range of technologies have been developed for providing broadband access to homes, apartments and offices. These technologies include: passive optical network (PON), cable, satellite and digital subscriber line (DSL). Each technology relies on a different communications medium, either wired, wireless or fiber for the transport of data to the building. Broadband access inside the building is distributed to TV's, computers, or other devices by a wired or wireless connection. Wired router connections to each TV or computer are typically provided by Ethernet cables strung through the building. Wireless router connections are made through base stations and receivers. Existing home and business distribution networks include: copper/aluminum wire for phone connections, existing cable connections for cable TV in various rooms, and existing copper/aluminum wire by which electricity is provided throughout all the rooms of the home.

What is needed is a method and apparatus for improving the ease, security and coverage of broadband access provisioning to residential and business customers.

SUMMARY OF THE INVENTION

A method and apparatus is disclosed for a multi-tone modem configured to couple to a wire line. The modem may in an embodiment of the invention be used in combination with other like modems to provide network coverage over a shared wire line communication medium.

In an embodiment of the invention the multi-tone modem has a plurality of shared and discrete components forming a transmit path and a receive path configured to couple to a wired communication medium for at least intermittent communication of a plurality of frequency division multiplexed (FDMA) multi-tone modulated communication channels thereon. The multi-tone modem includes a Fourier transform component to transform received multi-tone modulated communication channels between a time domain and a frequency domain and vice versa. The multi-tone modem also includes selected components on the receive path configured to determine alignments between the received multiplexed communication channels in the time domain using alignment determinations made in both a time domain portion of the receive path together with determinations made in a frequency domain portion of the receive path. The Fourier transform component is further configured to transform a stream of digitized samples of the received multiplexed communication channels from the time to the frequency domain using the alignment determinations for each multiplexed communication channel determined by the selected components on the receive path.

Associated means and method are also disclosed.

In another embodiment of the invention the multi-tone modem supports at least time division multiplexed (TDMA) communication of a plurality of multi-tone modulated communication channels on the wired communication medium. In an embodiment of the invention the multi-tone modem includes a scheduler component shared between the transmit and receive paths, and configured to schedule transmission of individual ones of the communication channels with other multi-tone modems network coupled to the wired communication medium during successive simplex intervals and to aggregate within a multiplexed one of the TDMA intervals, transmission receipt acknowledgments (ACKS) therefore, thereby improving a data transfer capability on the wired communication medium. In another embodiment of the invention the scheduler component is configured to schedule transmission of individual ones of the communication channels with other multi-tone modems network coupled to the wired communication medium in successive simplex intervals interlaced with simplex intervals for associated transmission receipt acknowledgments (ACKS), thereby also improving a data transfer capability on the wired communication medium.

Associated methods are also disclosed.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 2 is a timeline graph showing prior art approaches and associated overhead for network communications between the modems shown in FIG. 1;

FIG. 3A-3B are timeline graphs showing alternate embodiments of network scheduling protocols in accordance with the current invention which improve data transfer capabilities between the modems shown in FIG. 1;

FIGS. 6A, 6B, 6C are combined hardware and data processing diagrams for handling the network communications shown in FIGS. 5A-5B;

FIG. 7 is a process flow diagram for the network modems shown in FIG. 1 in accordance with an embodiment of the invention.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
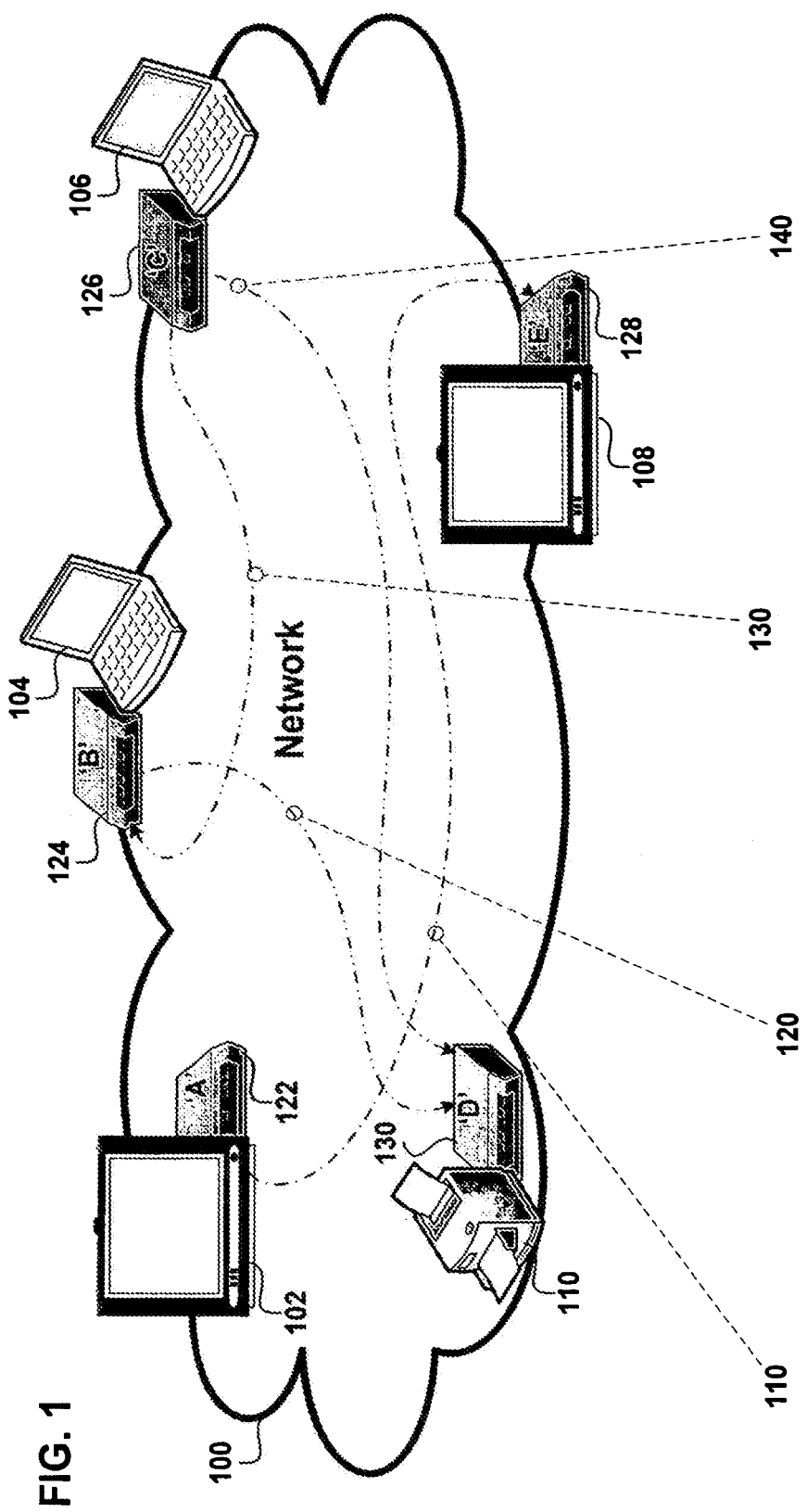
FIG. 1 is network diagram of discrete multi-tone (DMT) modulated modems coupled to one another via cable, phone line, or power lines, to form a network.

FIG. 1 is network diagram of discrete multi-tone (DMT) modulated modems coupled to one another via cable, phone line, or power lines, to form a network 100. Modem 122 is shown coupling television 102 to the network. Modem 124 is shown coupling computer 104 to the network. Modem 126 is shown coupling computer 106 to the network. Modem 128 is shown coupling television 108 to the network. Modem 130 is shown coupling printer 110 to the network. Communication channels 110, 120, 130 and 140 are shown between various ones of the network modems.

FIG. 2 is a timeline graph showing prior art approaches and associated overhead for network communications between the modems shown in FIG. 1. Considerable scheduling overhead is required for transmission receipt, processing, and acknowledgement of successive time division multiplexed communications of discrete communication channels. Communication channel 110 comprises a data portion 112 transmitted from a transmitting one of the networked modems and a transmission receipt acknowledgement (ACK) portion 216 from a receiving modem. Additional processing intervals for the receiving and sending modems respectively are also shown within the allotted time interval $t_{1-2}$ for the communication channel. Communication channel 120 comprises a data portion 220 transmitted from a transmitting one of the networked modems and a transmission receipt acknowledgement (ACK) portion 224 from a receiving modem. Additional processing intervals for the receiving and sending modems respectively are also shown within the allotted time interval $t_{2-3}$ for the communication channel. Communication channel 130 comprises a data portion 228 transmitted from a transmitting one of the networked modems and a transmission receipt acknowledgement (ACK) portion 232 from a receiving modem. Additional processing intervals 230 and 234 for the receiving and sending modems respectively are also shown within the allotted time interval $t_{3-4}$ for the communication channel. Communication channel 140 comprises a data portion 236 transmitted from a transmitting one of the networked modems and a transmission receipt acknowledgement (ACK) portion 240 from a receiving modem. Additional processing intervals for the receiving and sending modems respectively are also shown within the allotted time interval $t_{4-5}$ for the communication channel.

FIG. 3A-3B are timeline graphs showing alternate embodiments of network scheduling protocols in accordance with the current invention which improve data transfer capabilities between the modems shown in FIG. 1 by reducing data overhead.

In FIG. 3A a first scheduling protocol is shown which exhibits a 10-15% reduction in network overhead. In this embodiment of the invention scheduling involves transmitting individual ones of the communication channels in successive simplex intervals interlaced with simplex intervals for associated transmission receipt acknowledgments (ACKS), thereby improving a data transfer capability on the wired communication medium without requiring any frequency division multiplexing.

In FIG. 3B a second scheduling protocol is shown which exhibits a 20-30% reduction in network overhead. In this embodiment of the invention scheduling involves transmitting individual ones of the communication channels in successive simplex intervals and aggregating within a multiplexed one of the TDMA intervals, transmission receipt acknowledgments (ACKS) therefore, thereby improving a data transfer capability on the wired communication medium.

Figure 4:
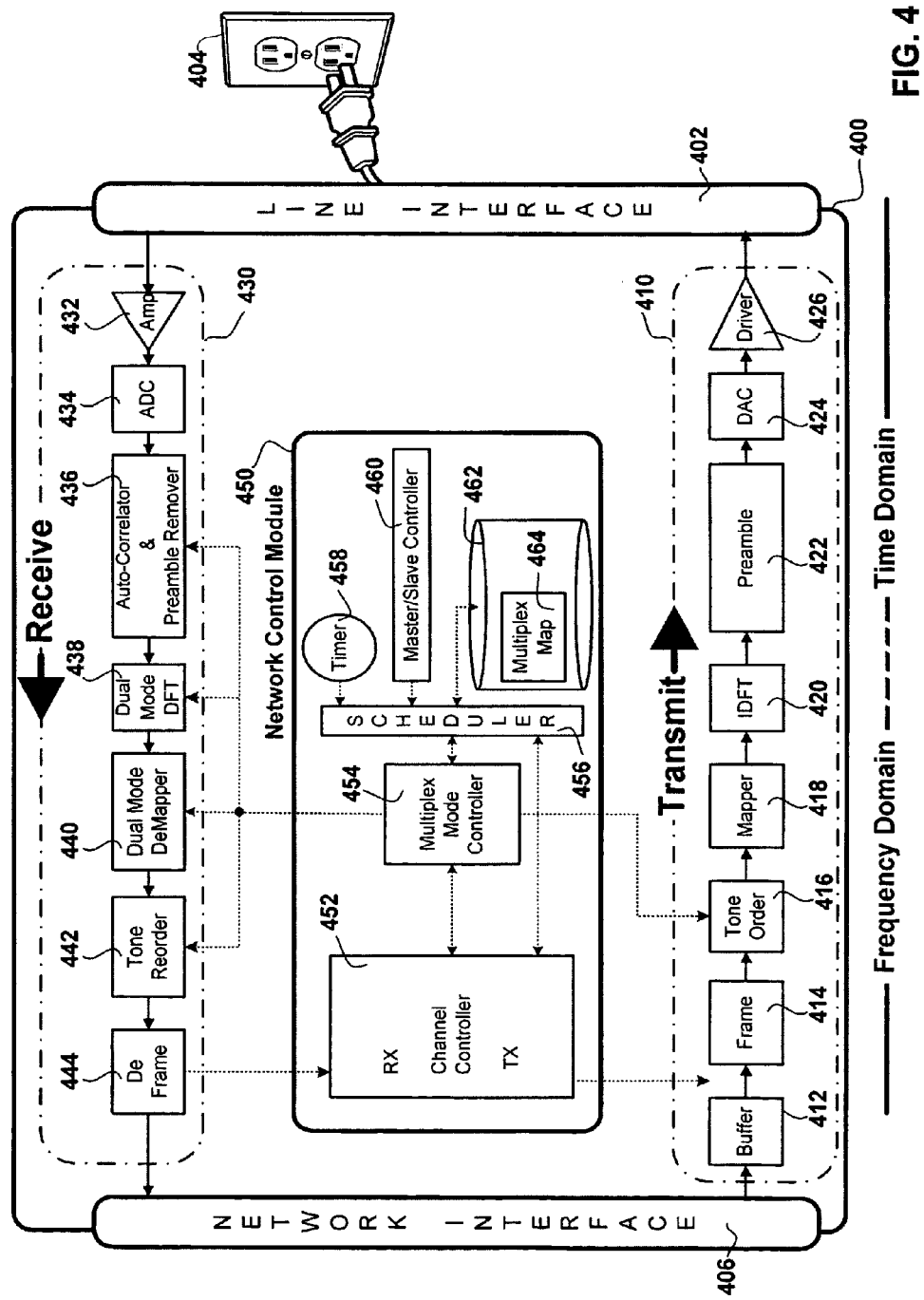
FIG. 4 is hardware block diagram of an embodiment of one of the DMT modems shown in FIG. 1.

FIG. 4 is hardware block diagram of an embodiment of one of the DMT modems shown in FIG. 1. The modem 400 includes both shared and discrete components coupled to one another to form a transmit path 410 and a receive path 430. The transmit and receive path couple at one end via line interface 402 to the shared communications medium, e.g. twisted wire pair, AC power line 404, or coaxial cable. The transmit and receive path couple at the opposing end via network interface 406 to an Ethernet or other packet based network appliance, Television, or other mixed or multi-media device.

The transmit and receive paths operate under the control of the network control module 450. The network control module includes: storage 462, master/slave controller 460, timer 458, scheduler 456, multiplex mode controller 454, and channel controller 452.

The network module and specifically the master/slave controller thereof support the automatic configuration of the modem into either the master or slave mode. In static embodiments of the invention master or slave mode may be determined by switch. In dynamic embodiments of the invention or slave mode is determined dynamically based on the state of the network. In a dynamic embodiment of the invention the determination of which mode the modem assumes is based on a determination of the presence or absence of an active master on the network. The first modem to assume master mode handles the synchronization and bandwidth allocation for all remaining modems. In the slave mode each modem requests bandwidth from the master, receives an allocation of bandwidth from the master, and configures it's transmit and receive paths to correspond to the bandwidth allocated by the master. The processes associated with the network module master and slave mode processes are set forth in further detail in FIG. 7.

Bandwidth allocation is handled by the network module as well, and specifically the scheduler component 456 thereof. Bandwidth allocation may in alternate embodiments of the invention be dynamic or static. Dynamic allocations of bandwidth may be implemented using either or both FDMA and or TDMA. Dynamic bandwidth as determined by the allocator sub-module may be based on a number of criteria including file type; file size; session type, e.g. streaming or intermittent (a.k.a. bursty); and quality of service (QOS) guarantees, for example. In an embodiment of the invention dedicated frequency range(s) without time division multiplexing, are allocated to streaming media, e.g. video and audio, based on the relatively high data rates and QOS requirements of streaming media. Remaining portions of the frequency spectrum may be sub-divided in either or both time and frequency to handle the access requirements of remaining links dedicated to intermittent file transfers such as printer or computer to computer file transfer links. Static bandwidth allocation including either or both FDMA and or TDMA allocations may be pre-programmed into each modem or may also be user selected via one or more switches. In an embodiment of the invention the modem in master mode synchronizes the network including frame rate and if the access protocol calls for it, time division multiplexing. The processes associated with the network module bandwidth allocation are also set forth in further detail in FIG. 7. Each modem's network control module includes a timer 458 coupled to the scheduler to enable tracking the network schedule propagated by the master one of the modems. The allocation maps 464 for multiplexing network communications are stored in storage 462. Once a schedule is established for network communication the multiplex mode controller 454 coupled to the scheduler configures the receive and transmit path components to support the scheduled multiplexing protocol, e.g. TDMA single channel or TDMA with FDMA multiplexed channels for example. The channel controller handles feedback between the receive and transmit path components. In an embodiment of the invention in which the network implements transmit and transmission receipt acknowledgement (ACK) protocols the channel controller blocks and or forces retransmission of a prior transmission depending on whether or not an ACK has been received.

The dedicated components of the transmit and receive paths support DMT modulation and demodulation of data. In an embodiment of the invention the transmit path includes: a buffer 412, a framer 414, a tone orderer 416, a constellation mapper 418, an inverse discrete Fourier transform (IDFT) component 420, a preamble adder component 422, a digital-to-analog (DAC) converter 424 and a line driver 426. The buffer stores transmitted data until an ACK is received. The framer frames one or more discrete channels of communication channel data into frames, while the tone orderer parses the bitstream onto associated tones, the mapper maps the allocated bits for each tone or subchannel within each successive tone set, each of which corresponds to a symbol. The IDFT transforms the discrete tones in each tone set from the frequency to the time domain. The preamble adder adds a preamble to each outgoing communication in each TDMA interval. The DAC converts the digital time domain data from the IDFT to an analog signal for amplification onto the shared communication medium via the line driver.

In an embodiment of the invention the receive path includes: a low noise amplifier 432, an analog-to-digital (ADC) converter 434, an autocorrelator and preamble remover 436, a dual mode discrete Fourier transform (DFT) module 430, a dual mode demapper 440, a tone reorderer 442, and a deframer 444. The received signal is amplified by the low noise amplifier and then converted from analog to digital by the ADC. The stream of digitized samples from the ADC's is analyzed by the autocorrelator which identifies at least the preamble portion thereof.

Where the stream of digitized samples from the ADC corresponds to a single communication channel the autocorrelator and subsequent receive path components are placed in a simplex mode of operation by the mode controller 454. In this simplex mode of operation the autocorrelator 436 completely identifies a preamble portion of the stream of digitized samples and removes the preamble portion. Subsequent symbols of the single received communication channel are passed to the DFT. The DFT performs a single transform from the time to the frequency domain of each successive symbol. The complex coefficients from the DFT are demapped in the demapper. After any associated tone reordering in the tone re-orderer 442, the resultant bit stream of the single received communication channel is deframed in the deframer 444 and passed to the corresponding TV, computer, or network attached peripheral to which the modem is coupled.

Alternately, where the stream of digitized samples from the ADC corresponds to multiplexed communication channels the autocorrelator and subsequent receive path components are placed in a multiplex mode of operation by the mode controller 454. In the multiplex mode of operation the autocorrelator 436 makes a coarse alignment determination based on detection of a preamble portion within the stream of digitized samples of the received multiplexed communication channels. The preamble portion is not removed, rather it is subject to further processing in the time and frequency domain to determine the offsets or pointers associated with individual samples identifying the start of each multiplexed channels sample set for the associated symbol interval. The dual mode demapper and dual mode DFT work together to precisely determine the resultant pointers which identify the offsets within the preamble portion of the digitized samples at which further sample sets for each of the multiplexed communication channels will be obtained and presented to the DFT. The resultant bit streams, i.e. one for each channel, are passed to subsequent receive path components shown in FIG. 4. for further processing.

Figure 5A:
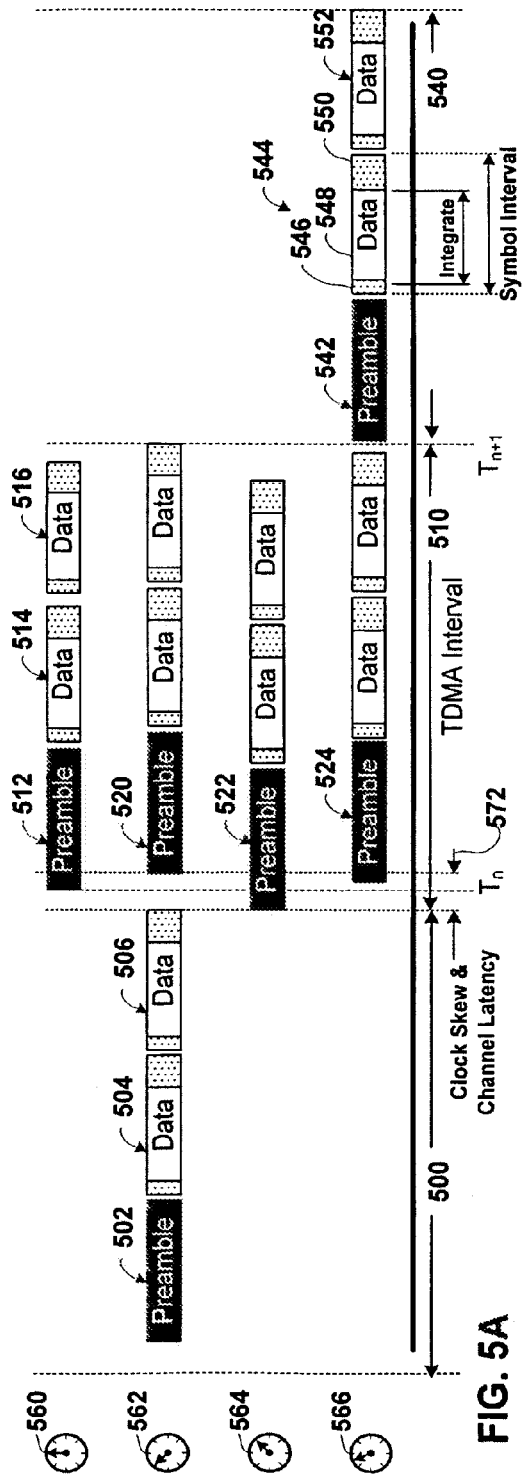
FIGS. 5A-5B are detailed timeline graphs of the network scheduling protocol shown in FIG. 3B.
Figure 5B:
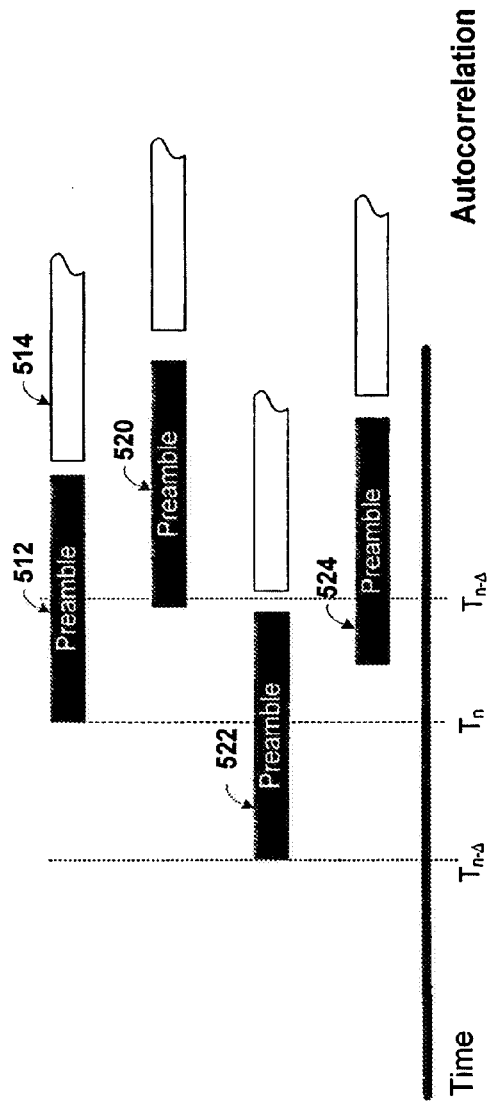

FIGS. 5A-5B are detailed timeline graphs of the network scheduling protocol shown in FIG. 3B. FIG. 5A shows successive TDMA intervals 500, 510, 540. In each interval one or more communication channels is present on the network each including a preamble symbol, followed by one or more data symbols. In an embodiment of the invention, each communication channel links a transmitting one of the networked modems to one or more receiving ones of the modems.

TDMA interval 500 includes a single communication channel successive symbols 502, 504, 506 of which are shown. An associated clock skew 562 for the channel is also shown.

TDMA interval 510 includes four multiplexed communication channels frequency division multiplexed with one another. The first communication channel includes successive symbols 512, 514, 516 and associated clock skew 560. The second communication channel includes successive symbols, e.g. preamble symbol 520 followed by data symbols. The associated clock skew 562 is shown. The third communication channel includes successive symbols, e.g. preamble symbol 522 followed by data symbols. The associated clock skew 564 is shown. The fourth communication channel includes successive symbols, e.g. preamble symbol 524 followed by data symbols. The associated clock skew 566 is shown.

TDMA interval 540 includes a single communication channel successive symbols 542, 544, 552 of which are shown. An associated clock skew 566 for the channel is also shown. In an embodiment of the invention frequency division duplexing may be utilized to improve network bandwidth utilization. In this embodiment of the invention each symbol, e.g. symbol 544, includes a cyclic prefix 546, a data portion 548, and a cyclic suffix portion 550.

The aggregate clock skew and channel latency 572 is shown for TDMA interval 510.

FIG. 5B is an exploded view of the timeline graph shown in FIG. 5A during the start of the multiplexed TDMA interval 510.

FIGS. 6A, 6B, 6C are combined hardware and data processing diagrams for handling the network communications shown in FIGS. 5A-5B. FIG. 6A shows the hardware and data processes associated with reception of a single communication channel, a.k.a. simplex mode. FIGS. 6B-6C show the hardware and data processing associated with reception of multiple communication channels, a.k.a. multiplex mode.

FIG. 6A shows the hardware and data processes associated with reception of a single communication channel, a.k.a. simplex mode. The dual mode hardware on the receive path configures itself into simplex mode when a single communication channel is modulated on the wireline. The TDMA intervals 500 and 540 shown in FIG. 5A shows each require such mode of processing. The analog-to-digital (ADC) converter 434, autocorrelator and preamble remover 436, discrete Fourier transform (DFT) and demapper 440 portions of the receive path components are shown. Of these components the ADC and the auto-correlator and preamble remover are identified as processing the received communication channel in the time domain, while the autocorrelator does so in the frequency domain. The DFT transforms the received communication channel between the time domain and the frequency domain.

Processing begins at the ADC in which the single modulated communication channel received over the wireline is converted to a stream of digitized samples. The autocorrelator 436 completely identifies a preamble portion 600 with a pointer 610 for example, and the preamble is then removed. The following datum 602 and 604 comprising discrete sets of digitized samples each associated with a single symbol interval of the single modulated communication channel is passed to the DFT after any associated cyclic prefix or suffix combinations are trimmed. The DFT performs a single transform from the time to the frequency domain of each discrete set 602 followed by 604. The DFT determines the complex coefficients 650 of each sub-channel or tone within the set generated in each symbol interval. The complex coefficients, e.g. coefficient 654, exhibit modest degrees of misalignment with adjacent points, e.g. point 656, in the quadrature amplitude modulated (QAM) 652 or other constellation associated with the multi-tone modulation protocol. The aligner subcomponent 660 of the demapper determines which point in the constellation map, the complex coefficient generated by the DFT for each tone corresponds to and the decoder 680 using a corresponding decoding table (not shown) converts each to a corresponding set of bits. The resultant bit stream is passed to subsequent receive path components shown in FIG. 4.

FIGS. 6B-6C show the hardware and data processing associated with reception of multiple communication channels, a.k.a. multiplex mode. In FIG. 6B preamble alignment for each of the multiplexed communication channels is determined in terms of offsets or pointers to a corresponding one of the digitized samples within the stream of digitized samples generated by the ADC from the received multiplexed communication channels. In FIG. 6C the pointers determined in FIG. 6A are used to identify overlapping sample set portions within each subsequent symbol interval for iterative processing by the DFT.

FIG. 6B shows the hardware and data processes associated with reception of frequency division multiplexed (FDMA) communication channels, a.k.a. multiplex mode. The dual mode hardware on the receive path configures itself into multiplex mode when more than one communication channel is modulated on the wireline. The TDMA interval 510 shown in FIG. 5A exhibits a case which requires such mode of processing. The ADC converter 434, autocorrelator and preamble remover 436, discrete Fourier transform (DFT) and demapper 440 portions of the receive path components are shown. Of these components the ADC and the auto-correlator and preamble remover are identified as processing the received communication channel in the time domain, while the autocorrelator does so in the frequency domain. The DFT transforms the received communication channel between the time domain and the frequency domain.

Processing begins at the ADC in which the multiple modulated communication channels received over the wireline are converted to a stream of digitized samples. The autocorrelator 436 makes a coarse alignment determination with a pointer 620 for example, based on detection of a preamble portion 612 within the stream of digitized samples of the received multiplexed communication channels. The preamble portion is not removed, rather it is subject to further processing in the time and frequency domain to determine the offsets or pointers associated with individual samples identifying the start of each multiplexed channels sample set for the associated symbol interval. The sample sets overlap but typically not entirely so, due to timing misalignments between the associated transmitting and receiving modems as well as the bursty nature of the FDMA multiplexed network transmission.

Sliding window 618 sub-portions 612a, 612b, 612c, of the preamble portion 612 identified by the autocorrelator are successively processed by the DFT 438. The DFT provides iterative transforms of overlapping sliding portions of the preamble portion of the digitized samples to the demapper. These transforms may be effected either with or without regard to the overlapping nature of the samples. In the latter case rather than calculating an entire DFT for each sample set, speed improvements result from implementing a sliding DFT algorithm in which the spectral component of the next discrete incoming sample is added to the prior transform and vice versa. In this latter case, the sliding DFT component 640 executes the Sliding FFT (SSFT). There are a number of well-known processes for implementing an SSFT one of which is incorporated herein by reference as if fully set forth herein appears in a paper/file entitled SFFT.TXT 'TMS320 DSP Applications' specifically, 'How the SFFT Works' and comes with an associated set of DSP files authored by Keith Larson and copyrighted 1996 by Texas Instruments Incorporated. The paper/file is available for download on the web as of the date of this filing at: http://www.engr.udayton.edu/faculty/jloomis/ece445/dsk3/sfft.html.

In either case the demapper 440 and specifically the aligner and error detector portion 660 thereof determines within each frequency range assigned to an associated one of the multiplexed communication channels which corresponding windowed portion of the preamble portion of the stream of digitized samples detected by the autocorrelator exhibits minimal demapping errors. In other words, the complex coefficients in each frequency range exhibit varying degrees of misalignment with adjacent points in the associated constellation 658 and 660 with the appropriate sliding sample set for each channel chosen to minimize such mean square errors for all points in the constellation. In an embodiment of the invention the mean square errors, e.g. errors 662 and 666, for each frequency range and for each sliding window transform provided by the DFT are evaluated by the corresponding channel aligner 664 and 668 to determine which sliding window sample set exhibits minimal demapping errors. The resultant pointer set 624 of preamble alignment pointers, one for each of the multiplexed channels, is, after determination in the frequency domain as described above, passed back to the autocorrelator 436 for use in processing subsequent symbol sets within the TDMA interval. The resultant pointers identify the offsets within the preamble portion of the digitized samples at which further sample sets for each of the multiplexed communication channels will be obtained and presented to the DFT. No further processing of the preamble is affected.

In FIG. 6C the pointers 624 determined in FIG. 6A are used to identify overlapping sample set sub portions within each subsequent symbol interval for iterative processing by the DFT. The following data 614 and 616 comprising discrete sets of digitized samples each associated with a single symbol interval of the multiple modulated communication channels is passed to the DFT after any associated cyclic prefix or suffix combinations are trimmed. The DFT performs complete or sliding transforms equal in number to the number of pointers 624 thereby transforming each of the multiplexed communications from the time to the frequency domain. Windowed portions 614a and 614b of sample set 614 are shown.

The DFT determines the complex coefficients of each subchannel or tone within the sets generated in each symbol interval. The complex coefficients exhibit modest degrees of misalignment with the associated constellation, e.g. 662 and 664, when the appropriate sliding sample set for each channel is transformed.

The aligner subcomponent 660 of the demapper and specifically dedicated sub-portions thereof, e.g. 670 and 672, determines for each associated frequency range and corresponding one of the multiplexed channels, which point in the constellation map, the complex coefficient generated by the DFT for each tone corresponds to. The discrete sets of coefficients associated with each assigned frequency range are the decoded in a corresponding decoder, e.g. decoders 682 and 684 using the corresponding decoding table (not shown). The resultant bit streams, i.e. one for each channel, are passed to subsequent receive path components shown in FIG. 4. for further processing.

In alternate embodiments of the invention the multiplex mode processing discussed above may be utilized for processing bursty FDMA multiplexed communication channels on a wireline regardless of whether the underlying communication protocol also includes a time division multiple access (TDMA), carrier sense multiple access (CSMA) protocol.

FIG. 7 is a process flow diagram for an embodiment of the invention in which the multi-tone modems are network coupled to one another as shown in FIG. 1. In an embodiment of the invention the network control module in each multi-tone modem dynamically determines whether to configure the modem into either master or slave mode. After initialization in start block 700 control passes to decision process 704. In decision process 704 the modem determines the network status, i.e. whether or not there is an existing master on the network to which it is coupled. If the modem itself is master then there is no change in status and control passes to master processes commencing with process 710. If the modem itself is not master, then the modem determines whether the master portion of the control channel is active, indicating another modem in the network is currently the active master in which control passes to slave processes commencing with process 706. Alternately, if the modem is not master, and the master control channel is not active then control passes to the first of the master processes, i.e. process 710.

If another modem is currently master then the modem enters slave mode the initial step of which is to determine required throughput, duration and quality of service (QOS) in process 706. Next in process 708, the modem in slave mode sends the bandwidth requirements determined in the prior step to the master.

Alternately, if this modem is currently master or if no modem is currently master then the modem enters master mode the initial step of which is to become master of the network. Then in process 710 the modem in master mode receives the bandwidth requirements from all requesting slaves. Next in process 712 the network controller 450 (See FIG. 4) of the modem in master mode, determines a mix of frequency and or time division multiplexing of modem-to-modem channels which meets the bandwidth requirements of all modems including the master and requesting slaves. In an embodiment of the invention dedicated frequency range(s) without time division multiplexing, are allocated to streaming media, e.g. video and audio, based on the relatively high data rates and QOS requirements of streaming media. Remaining portions of the frequency spectrum are sub-divided in either or both time and frequency to handle the access requirements of remaining links dedicated to intermittent file transfers such as computer-to-printer or computer-to-computer file transfer links. Next in decision process 714 a determination is made as to whether the communication protocol on the network specifies each transmission to be accompanied by a transmission receipt acknowledgement (ACK) from the receiving one of the modems. If ACKS are required for network operation then control passes to process 716, otherwise process 718.

In process 716 the mix of time and frequency division multiplexing and associated communication channels is revised in accordance with one of the following two scheduling methodologies for improving network transport capabilities. In a first methodology, ACKS are aggregated into an FDMA interval after a threshold number of unacknowledged communication channel transmissions. In a second methodology the interval between each transmission and a corresponding ACKS is scheduled for transmission of other communication channels thereby also improving network transport capabilities. Next control passes to process 718.

Then in process 718 the allocated channel a.k.a. session information, including bandwidth allocation, frame rate, frequency and time slots, is broadcast on to the other modems on the network.

After the last dedicated master step 718 or slave step 708 the modem, whether in master or slave mode, executes processes commencing with process 730. In process 730 the modem updates its channel, a.k.a. session, allocation to correspond with the determination made by the master in process 718.

Next in decision process 732 a determination is made as to whether the next transmission interval, whether allocated on the basis of carrier sense multiple access (CSMA), time division multiple access (TDMA), contains an FDMA overlay or not. If multiple channels are to be multiplexed in the allocated interval then control passes to the first of the multiplex mode communication processes 734. Alternately if a single channel is allocated to the next transmission interval then control passes to the simplex mode process 748.

In process 748 any preamble associated with transmission of the single communication channel is located in the time domain exclusively by the autocorrelator 436 shown in FIG. 4. The alignment information thereby derived is used for transforming subsequent portions of the single received communication channel in process 750.

Alternately, where multiple communication channels are frequency division multiplexed control passes to process 734. In process 734 the digital multi tone (DMT) channel assignments are configured in both the dual mode, discrete Fourier transform component (DFT) on the receive path, as well as the inverse discrete Fourier transform component (IDFT) on the transmit path. Next in process 736 coarse alignment in the time domain with the preambles portion of the digitized samples of the received communication channels is accomplished by the autocorrelator 436 (see FIG. 4). Next, in process 738 a fine alignment of each preamble associated with a corresponding one of the multiplexed communication channels in terms of its offset within the preamble portion of the digitized sample is effected by the combined operation of the DFT and specifically the sliding DFT portion thereof 640 (See FIG. 4) in combination with the dual mode demapper 440 (See FIG. 4). The DFT provides iterative transforms of overlapping sliding portions of the preamble portion of the digitized samples to the demapper. These transforms may be effected either with or without regard to the overlapping nature of the samples. In the latter case rather than calculating an entire DFT for each sample set, speed improvements result from implementing a sliding DFT algorithm in which the spectral component of the next discrete incoming sample is added to the prior transform and vice versa. In either case the demapper determines within each frequency range assigned to an associated one of the multiplexed communication channels which corresponding windowed portion of the preamble portion of the stream of digitized samples detected by the autocorrelator exhibits minimal demapping errors. The resultant pointers identify the offsets within the preamble portion of the digitized samples at which further sample sets for each of the multiplexed communication channels will be obtained and presented to the DFT. Next in process 732 each successive symbol interval within the TDMA/CSMA slot, the DFT effects either a single transform using the single pointer determined exclusively in the time domain in the case of single received communication channel, or multiple transforms on overlapping sample sets using the multiple pointers determined jointly in the time and the frequency domain in the case of multiplexed communication channels. Control in an embodiment of the invention then returns to decision process 732 for receiving the next TDMA or CSMA processing interval.

If the master goes down at any time, or the bandwidth requirements of a slave or master change the processes are all repeated, thereby allowing the network to dynamically respond to either loss of a master, or to changing bandwidth requirements in real time, and without downtime on the network.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone modem with a plurality of shared and discrete components forming a transmit path and a receive path configured to couple to a wired communication medium for at least one of time division multiplexed (TDMA) communication and carrier sense multiplexed (CSMA) communication of a plurality of multi-tone modulated communication channels thereon, and the multi-tone modem comprising:
   a scheduler component shared between the transmit and receive paths, and configured to schedule transmission of individual ones of the communication channels with other multi-tone modems network coupled to the wired communication medium during successive simplex intervals and to aggregate within a successive single multiplexed interval, transmission receipt acknowledgments (ACKS) therefore, thereby improving a data transfer capability on the wired communication medium, wherein the simplex intervals each comprise a single time interval of the TDMA or CSMA communication during which only one of the plurality of communication channels of the communication medium is being used.

2. The multi-tone modem according to claim 1, wherein the multiplexed one of the TDMA intervals uses FDMA transmission of the ACKS on all of the plurality of communication channels.

3. The multi-tone modem according to claim 1, wherein certain of the simplex intervals include transmission of a plurality of discrete multi-tone (DMT) symbols on the respective single one of the plurality of communication channels.

4. A multi-tone modem with a plurality of shared and discrete components forming a transmit path and a receive path configured to couple to a wired communication medium for at least one of time division multiplexed (TDMA) communication and carrier sense multiplexed (CSMA) communication of a plurality of multi-tone modulated communication channels thereon, and the multi-tone modem comprising:
   a scheduler component shared between the transmit and receive paths, and configured to schedule transmission of individual ones of the communication channels with other multi-tone modems network coupled to the wired communication medium in successive simplex intervals interlaced with simplex intervals for associated transmission receipt acknowledgments (ACKS), thereby improving a data transfer capability on the wired communication medium, wherein the simplex intervals each comprise a single time interval of the TDMA or CSMA communication during which only one of the plurality of communication channels of the communication medium is being used.

5. The multi-tone modem according to claim 4, wherein certain of the simplex intervals include transmission of a plurality of discrete multi-tone (DMT) symbols on the respective single one of the plurality of communication channels.

6. A method for operating a multi-tone modem with a plurality of shared and discrete components forming a transmit path and a receive path configured to couple to a wired communication medium for at least one of time division multiplexed (TDMA) communication and carrier sense multiplexed (CSMA) communication of a plurality of multi-tone modulated communication channels thereon, and the method comprising:
   scheduling transmission of individual ones of the communication channels with other multi-tone modems network coupled to the wired communication medium during successive simplex intervals ad to aggregate within a successive single multiplexed interval, transmission receipt acknowledgments (ACKS) therefore, thereby improving a data transfer capability on the wired communication medium, wherein the simplex intervals each comprise a single time interval of the TDMA or CSMA communication during which only one of the plurality of communication channels of the communication medium is being used.

7. The method according to claim 6, wherein the multiplexed one of the TDMA intervals uses TDMA transmission of the ACKS on all of the plurality of communication channels.

8. The method according to claim 6, wherein certain of the simplex intervals include transmission of a plurality of discrete multi-tone (DMT) symbols on the respective single one of the plurality of communication channels.

9. A method for operating a multi-tone modem with a plurality of shared and discrete components forming a transmit path and a receive path configured to couple to a wired communication medium for at least one of the time division multiplexed (TDMA) communication and carrier sense multiplexed (CSMA) communication of a plurality of multi-tone modulated communication channels thereon, and the method comprising:

scheduling transmission of individual ones of the communication channels with other multi-tone modems network coupled to the wired communication medium in successive simplex intervals interlaced with simplex intervals for associated transmission receipt acknowledgments (ACKS), thereby improving a data transfer capability on the wired communication medium, wherein the simplex intervals each comprise a single time interval of the TDMA or CSMA communication during which only one of the plurality of communication channels of the communication medium is being used.

10. The method according to claim 9, wherein certain of the simplex intervals include transmission of a plurality of discrete multi-tone (DMT) symbols on the respective single one of the plurality of communication channels.

\* \* \* \* \*